United States Patent [19]

Van Ornum et al.

[11] 4,113,799

[45] Sep. 12, 1978

[54] ELASTOMERIC SEALANT COMPOSITION

[75] Inventors: Joel V. Van Ornum, Kirkland, Wash.; Peter L. Stang, Port Tobacco, Md.

[73] Assignee: Rocket Research Corp., Redmond, Wash.

[21] Appl. No.: 595,351

[22] Filed: Jul. 14, 1975

[51] Int. Cl.² ............ C08L 53/00; C08L 45/00; C08L 23/22

[52] U.S. Cl. .................. 260/876 B; 260/829; 260/888

[58] Field of Search .............. 260/888, 876 B, 829

[56] References Cited

U.S. PATENT DOCUMENTS

| | | | |
|---|---|---|---|
| 3,880,953 | 4/1975 | Downey | 260/888 |
| 3,935,893 | 2/1976 | Strang | 260/876 B |
| 3,950,280 | 4/1976 | Singleton | 260/888 |
| 3,954,692 | 5/1976 | Downey | 260/888 |

FOREIGN PATENT DOCUMENTS 806,198 12/1958 United Kingdom .................. 260/888

Primary Examiner—Paul Lieberman
Attorney, Agent, or Firm—Dowrey & Cross

[57] ABSTRACT

A carbon reinforced, partially cross-linked butyl rubber matrix sealant composition as described is particularly suitable for use as a self-healing tire puncture sealant. The sealant composition comprises a high average molecular weight butyl rubber and a low average molecular weight butyl rubber in a ratio of high to low molecular weight butyl rubber of between about 20/80 to 60/40, in admixture with a tackifier present in an amount between about 55 and 70 weight % of the composition. A partially hydrogenated block copolymer may be included in the admixture.

7 Claims, 4 Drawing Figures

ELASTOMERIC SEALANT COMPOSITION

FIELD OF THE INVENTION

The sealant composition of this invention was developed as a self-healing tire puncture sealant. As a tire sealant, it is adapted for application to the internal surface of a rubber tire and is intended to seal puncture holes in the tread region under widely varying temperature conditions. Being suitable as a tire sealant, the sealant composition of this invention is applicable to other, similar as well as less severe, uses.

BACKGROUND OF THE INVENTION

A suitable self-healing tire puncture sealant must withstand wintertime temperatures to which tires are subjected when standing idle. Such a sealant must also withstand the high temperatures to which tires are heated under summertime driving conditions. These temperatures typically range from −20° F to 270° F. A suitable tire sealant must be capable of sealing punctures when the puncturing object is retained in the tread and also when the puncturing object is removed. Thus, a tire sealant must be capable of adhering to the puncturing object as it works against a flexing tire during travel and must be capable of adhering to itself to seal the puncture after removal of the puncturing object. In addition, the sealant must remain effective for an extended period of time. These conditions require a combination of flexibility, tackiness and strength that are among the most demanding required of any sealant composition. Finally, a suitable tire sealant must be susceptible to economical formulation and application.

Because butyl rubber exhibits low air permeability and high resistance to aging, the prior art has attempted to utilize butyl rubber as a basic compound of sealants. Exemplary of such prior art are U.S. Pat. Nos. 2,756,801; 2,765,018, and 2,782,829. The sealant compositions described in such prior art, however, are inadequate at the temperature extremes to which automatic tires are subjected considering the requirements that such sealant compositions must be resistant to creep and must be self healing.

SUMMARY OF THE INVENTION

The sealant composition of this invention is formulated with a carbon reinforced curable butyl rubber matrix and certain modifiers to achieve the necessary mechanical strength, thermal stability, and sealing capabilities required to a commercially acceptable self-healing tire puncture sealant. The sealant composition comprises a combination of partially cross-linked (i.e. partially cured) high and low molecular weight butyl rubbers, a tackifier, and a carbon reinforcer. The weight ratio of high molecular weight to low molecular weight butyl rubber may vary from 20/80 to 60/40. The tackifier constitutes about 55–70 wt. % of the composition and the carbon reinforcer constitutes up to about 17 wt. % of the composition, the balance being the cross-linked rubber constituents. To aid in maintaining sufficient tackiness and thermal stability at elevated temperatures, a thermoplastic and elastomeric partially-hydrogenated block copolymer may be included up to about 10 wt. % of the composition, the block copolymer having a general configuration of $A-(B-A)_{1-5}$ wherein prior to hydrogenation each A is a monovinyl arene polymer block and each B is a conjugated diene polymer block.

The sealant composition may be applied by a variety of means. For purposes of tire sealing, the sealant composition may be formulated as a sprayable composition that cures in situ or as a composition that is first cured in sheet form and then applied. For other purposes, the sealant composition may be extruded or brushed onto a substrate. A suitable solvent, such as toluene, may be employed in the preparation of the sealant composition. The weight percentages specified herein, however, are on a solvent-free basis, unless otherwise noted.

DETAILED DESCRIPTION OF THE INVENION

Figure 1:
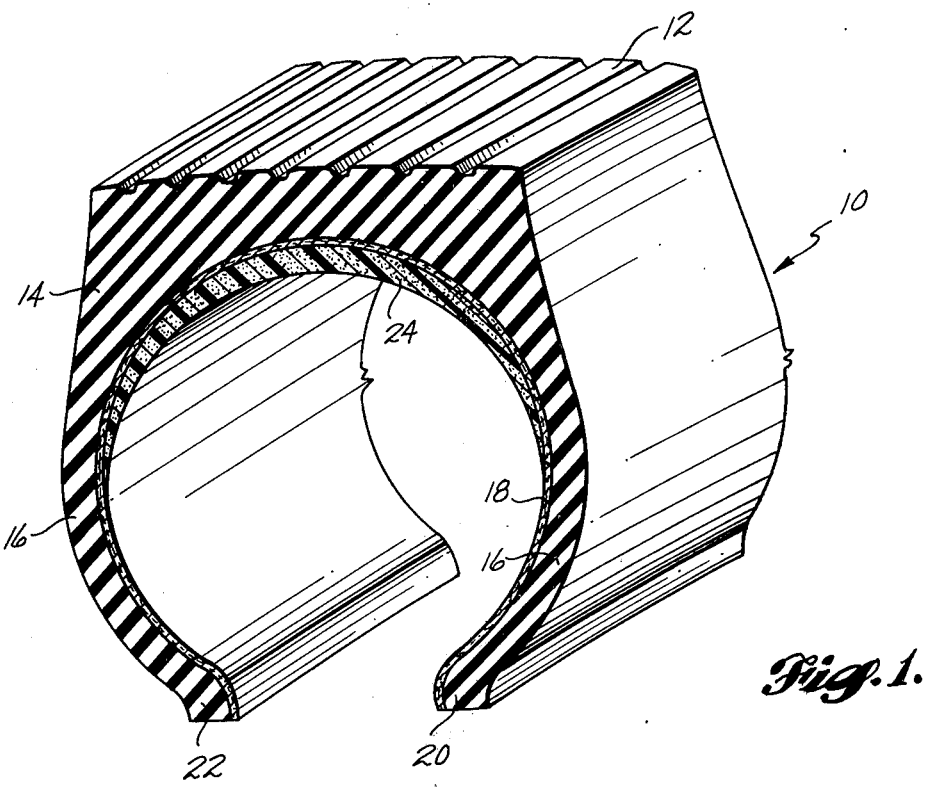
FIG. 1 is a perspective view of a cross-section of a vehicle tire illustrating one embodiment of the invention in which the sealant composition layer is located on the innermost surface of the tire behind the tread.

The copolymer matrix which provides the strength and continuity of the sealant composition of this invention is herein termed "butyl rubber". Butyl rubber is intended to include copolymers of 96–99 wt. % isobutylene and 4–1 wt. % isoprene (Butyl IIR) as well as other rubbery copolymers of a major proportion (i.e., over 50% by weight) of an issolefin having from 4 to 7 carbon atoms with a minor proportion by weight of an open chain conjugated diolefin having from 4 to 8 carbon atoms. The copolymer may consist of from 70 to 99.5% by weight of an isomonoolefin such as isobutylene or ethyl methyl ethylene copolymerized with from 0.5 to 30% by weight of an open chain conjugated diolefin such as isoprene; butadiene -1,3; piperylene; 2,3-dimethyl-butadiene -1,3; 1,2- dimethyl-butadiene -1,3 (3-methyl pentadiene -1,3); 1,3 -dimethyl butadiene -1,3; 1-ethyl butadiene -1,3 (hexadiene -1,3); 1,4-dimethyl butadiene -1,3 (hexadiene -2,4); the copolymerization being effected by the usual manner of copolymerizing such monomeric materials.

A high molecular weight butyl rubber, as this term is used herein, refers to butyl rubber having an average molecular weight in excess of 100,000. While the use of butyl rubber having an average molecular weight in excess of 300,000–400,000 will not detract from the sealing qualities of the sealant, such butyl rubber is comparatively difficult to dissolve and combine with other constituents, as well as difficult to apply via an air spraying tehcnique. Thus the preferred weight range for the high molecular weight butyl rubber is from 100,000 to about 300,000–400,000. Low molecular weight butyl rubber, as the term is used herein, refers to butyl rubber having an average molecular weight, and therefore viscosity, substantially less than, on the order of about 1/10th, that of the high molecular weight butyl rubber. Because of the present commerical availability, the preferred molecular weight range for low molecular weight butyl rubber is from 10,000 to 30,000.

Cross-linking of the butyl rubber constituents may be effected by one of the known sulfur or quinoid systems. Although butyl rubber may be cured using a vulcanization process (sulfur and accelerators such as mercaptobenzothiazole), such a cure results in a rubber that over time is subject to degredation caused by oxygen or ultraviolet radiation. Such degredation may be partly prevented through the use of antioxidants, such as diphenyl - p - phenylene- diamine, phenyl-beta-naphthylamine and hydroquinone, and antiozonants, such as N,N'-di (2-octyl) -p- phenylenediamine and N-(1-3-demethyl-butyl) -N'- phenyl-p-phenylenediamine. Nevertheless, the characterists of the resulting sealant change sufficiently over time to make a quinoid curing system preferable to vulcanization for the tire sealing applications, where the sealant must be capable of lasting years in a harsh environment. Quinoid cures depend of cross-linking through the nitroso groups of aromatic nitroso compounds. In the quinoid curing system, p-quinone dioxime ("G-M-F") and p,p-di-benzoylquinone dioxime are preferred as the curing agents. Other suitable curing agents include dibenzoyl-p-quinone dioxime ("Dibenzo G-M-F"), p-dinitrosobenzene and N-Methyl-N, 4-dinitrosoanilene, the latter two being available on a clay base as "Polyac" from E. I. duPont Nemours & Co. and as "Elastopar" from Monsanto Chemical Co., respectively. The cross-linking activators which may be employed in the sealant composition include inorganic peroxides, organic peroxides (including diaroyl peroxides, diacyl peroxides and peroxyesters) and polysulfides. Exemplary are lead peroxide, zinc peroxide, barium peroxide, copper peroxide, potassium peroxide, silver peroxide, sodium peroxide, calcium peroxide; metallic peroxyborates, peroxychromates, peroxycolumbates, peroxydicarbonates, peroxydiphosphates, peroxydisulfates, peroxygermanates, peroxymolybdates, peroxynitrates, magnesium peroxide, sodium pryophosphate peroxide, and the like; the organic peroxides such as lauryl peroxide, benzoyl peroxide, 2,4-dichlorobenzoyl peroxide, t-butyl peroxybenzoate, dibenzoyl peroxide, bis (p-monomethoxy-benzoyl) peroxide, p-monomethoxy-benzoyl peroxide, bis (p-nitrobenzoyl) peroxide, and phenacetyl peroxide; the metallic polysulfides such as calcium polysulfide, sodium polysulfide, potassium polysulfide, barium polysulfide, and the like and the organic polysulfides such as the alkyl polysulfides, aryl polysulfides, aralkyl polysulfides, which possess the general formula R-(S)$_x$-R where R is a hydrocarbon group and $x$ is a number from 2 to 4. The actual cross-linking agent is believed to be the oxidation product of quinone dioxime, p-dinitroso benzene.

The curing agent/cross-linking activator combination which has been found to result in the shortest gel time is the p-quinone dioxime/benzoyl peroxide combination. The preferred concentration of p-quinone dioxime is 2–4% by weight of butyl rubber. The preferred concentration of benzoyl peroxide is 7–10% by weight of butyl rubber.

Accelerators may be employed as appropriate. For example, cobalt napthenate may be used in combination with t-butyl peroxybenzoate, and chloranil (2,3,5,6 - tetrachloro - 1,4 - benzoquinone) may be used in combination with t-butyl peroxybenzoate or benzoyl peroxide.

The tackifying agent serves two functions. First it decreases the elastic modulus of the sealant composition and thus increases its ability to self-heal over a puncture wound. Second, it increases the sealant composition's tack, i.e., its ability to adhere to other objects. The several classes of tackifiers which are suitable for use in the sealant composition of this invention include low temperature tackifiers, which associate primarily with the elastomeric compounds, and high temperature tackifiers, which associate primarily with the more rigid components such as the end blocks of the block copolymers. Examples of classes of low temperature tackifiers are synthetic polyterpenes, thermoplastic olefins, pentaerythritol esters of hydrogenated rosins, and termoplastic hydrocarbons. High temperature classes of tacifiers include triethylene glycol esters of hydrogenated rosins, vinyl toluene copolymers, alkyl aromatics and coumarone-indenes. Methyl esters of hydrogeanated rosins, also suitable, are thought to associate with both phases. Preferred tackifiers are fluid monoolefin polymers of moderate viscosity, such as those consisting of essentially butylene (1-butene, 2-butene and isobutylene) with the balance being isoparaffins, having average molecular weights in the range of 500 to 5,000, terpene polymer resins such as polymerization products of B-pinene, and low molecular weight styrene polymer resins such as polymerization products of A-methylstyrene.

The reinforcing agent provides tensile strength to the sealant. It may be of any one or more of a large number of well known substances provided that one of these substances must be finely divided carbon. Carbon, such as carbon black, provides reaction sites for the curing process, and preferably comprises at least 1% of the solids by weight. The substance comprising the remainder of the reinforcing agent may either be carbon black or some other suitable substance selected on the basis of the desired color of the sealant. The reinforcing agent should be present in an amount not exceeding 17% of the solids by weight. Above this concentration, the sealant composition has an unsuitably high tensile strength. Examples of well known reinforcing agents for butyl rubbers include zinc oxide, aluminum hydrate, lithopone, whiting, clays, hydrated silicas, calcium silicates, silicoaluminates, magnesium oxide, and magnesium carbonate.

The block copolymer constituent, prior to hydrogenation, is composed of "A" blocks of monovinyl arene polymers including styrene, alpha methyl styrene, ring alkylated styrenes, and the like, as well as mixtures thereof, and "B" blocks of conjugated diene polymers having 4 to 10 carbon atoms per monomer molecule, including butadiene and isoprene. The A blocks make up the end groups and typically comprise about one third of the copolymer by weight, and the B blocks make up the mid groups and the balance of the copolymer. The copolymer is partially hydrogenated so that the conjugated diene block segments are substantially fully saturated. The monovinyl arene polymer block segments are not appreciably saturated. Hydrogenation in this fashion enhances the utility of the block copolymer as an oxidation and high temperature-degradation resistant constituent of the sealant composition. The average molecular weight of the copolymer is in the range of about 60,000 to 400,000. Block copolymers of this type are described in U.S. Pat. No. 3,595,942.

The sealant composition constituents are either soluble or dispersable in hydrocarbon and chlorinated solvents, exemplary of which are toluene, hexane, heptane, naptha, trichloroethylene and cyclohexane. Tetrahydrofuran is also a suitable solvent. Combination of the above solvents can also be used. Toluene has been found to be the most suitable.

Within the ratio of high molecular weight to low molecular weight butyl rubber defined herein, 20/80 to 60/40, the resultant sealant composition is capable of maintaining its adherence to a tire substrate while being stretched by a tread-penetrating object, such as a nail; is capable of adhering to the puncturing object, so as to form a seal about the object; and is capable of healing itself so as to re-seal a puncture wound after the puncturing object is removed. High-low molecular weight butyl rubber ratios outside of the herein-defined ratios do not provide sealant compositions capable of meeting these parameters over the required temperature ranges or capable of remaining elastic for sufficient periods of time and, hence, are unsatisfactory. Within the herein defined ratios of high-low molecular weight butyl rubbers, the resultant sealant composition modulus of elasticity is quite different.

Furthermore, a sealant composition having a ratio of high molecular weight to low molecular weight butyl rubber between about 35/65 to 45/55 has unexpectedly superior properties. Its initial modulus of elasticity, that is to say its modulus of elasticity during initial elongation, is quite low. This property enhances the puncture sealing capabilities of the sealant composition in that a puncturing object will disrupt the sealant composition to a lesser extent. Consequently, the sealant composition in the vicinity of a puncture responds more quickly to a break or tear in its continuity and the extent of puncturing damage is less.

Figure 3:
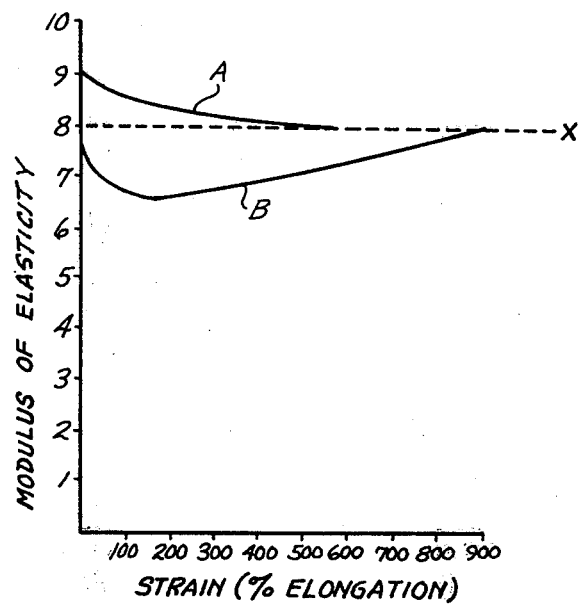
FIG. 3 is a graph showing Modulus of Elasticity vs. Strain for a sealant composition having a high to low molecular weight butyl rubber ratio of about 60/40 and a sealant composition having a high to low molecular weight butyl rubber ratio of about 35/65 to 45/55.

While the ultimate tensile strength (i.e., the point of breakage during the elongation testing) and modulus of elasticity for sealant compositions having high to low molecular weight butyl rubber ratios components in the range of about 20/80 to 60/40 are generally the same, the manner in which the cured sealant compositions react during elongation and prior to reaching ultimate tensile stength is quite different within the range of about 35/65 to 45/55. Specifically and as more graphically described in FIG. 3, it has been discovered that while sealant compositions with a high to low molecular weight butyl rubber ratio of about 60/40, line A of FIG. 3, were relatively strong during low strain situations, i.e., a relatively high modulus of elasticity during initial elongation, a sealant composition with a high to low molecular weight butyl rubber ratio between about 35/65 to 45/55, line B of FIG. 3, is relatively weak in such situations and has a relatively low modulus of elasticity during its initial phases of elongation. Also, the latter's (line B) modulus of elasticity has an over-all increase during complete elongation of the cured composition to the point of ultimate tensile strength, while the former's (line A) modulus of elasticity has an over-all decrease during the complete elongation to the point of ultimate tensile strength. The importance of these particular factors is that the puncture sealing capability of a sealant has been found to be much more important during initial elongation and low strain situations rather than at the point of ultimate tensile stress or breakage. If the sealant is quite strong during the initial elongation, and when an object punctures the tire and the sealant layer, the remainder of the sealant has a tendency to pull away from the puncture wound and therefore not seal the puncture. However, with the latter, which has a low strength during the initial elongation, the sealant stays in position when it is punctured and therefore seals the wound much easier. Thus, since the sealant must elongate during the low strain situations in order to adequately seal a puncture, sealant compositions having a high tensile strength during low strain situations, as in the former, may not seal the puncture as consistently. On the other hand, during high strain situations such as presented by a 40 to 50 psig internal tire pressure, it is not desirable to have the sealant flow if the tire is to remain inflated after a puncture has been sealed. This is accomplished by the present invention since after initial sealant elongation, the modulus of elasticity and the tensile strength of the present composition increase continuously to the point of ultimate tensile strength.

Because the sealant composition described herein has the unique ability to resist oxidation, and to remain stable and effective over a wide temperature range, it has numerous applications, such as a caulking compound and as a roofing sealant, in addition to its utility as a tire sealant. Because the environment, to which a tire sealant is subjected is the most severe, the following examples relate the sealant composition to this environment for purposes of illustration. It will be understood that the ratio of the essential ingredients may be varied within the ranges set forth above and that other compounding materials may be replaced by and/or supplemented with such other materials as may be appropriate to deal with the environment contemplated.

With particular respect to the vehicle tire sealant embodiment and with reference to FIG. 1, a vehicle tire 10 conventionally includes a tread portion 12, a carcass portion 14 and side walls 16. In tubeless vehicle tires it is generally desirable to employ a barrier layer or lining 18 which is impermeable to air. The air impermeable lining 18 typically extends over the entire inner surface of the tire 10 from one bead portion 20 to the other bead portion 22. In accordance with the embodiment of the present invention illustrated in FIG. 1, a sealant layer 24 is placed on the inside of the tire 10 against the air barrier layer 18. The sealant layer 24 is arranged to lie principally behind the tread 12 of the tire 10 so that the sealant layer will principally serve to seal punctures occurring in the tread portion of the tire.

Figure 2:
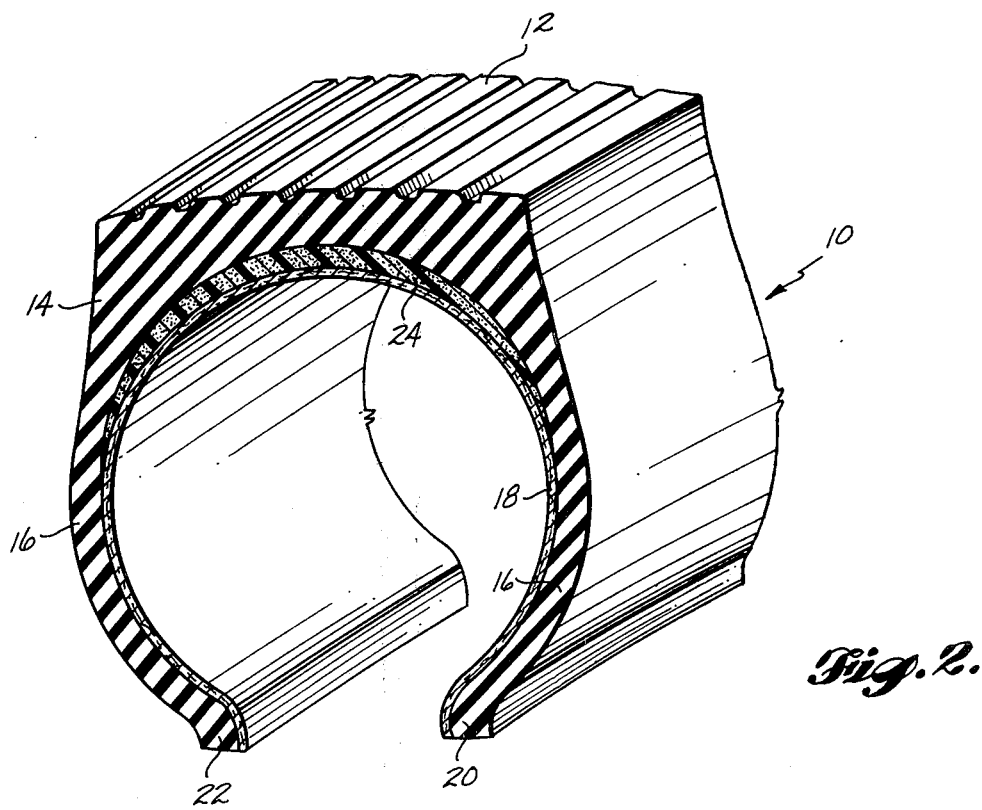
FIG. 2 is a perspective view similar to FIG. 1, illustrating a second embodiment of the invention in which the subject sealant layer is located behind the tread portion of the vehicle tire and between an air impervious film conventionally employed in a tubeless tire and the carcass portion of the tire.

FIG. 2 illustrates another embodiment of the present invention wherein a vehicle tire 10 has parts similar to those illustrated in FIG. 1, and identified by like numerals. However, in this particular embodiment the sealant layer 24 is located between the carcass portion 14 of the tire 10 and the air impermeable barrier layer 18. The vehicle tire embodiment illustrated in FIG. 1 normally occurs when the sealant layer 24 is applied after the tire 10 has been formed and cured. The vehicle tire embodiment illustrated in FIG. 2 occurs when the sealant layer 24 is incorporated into tire 10 when the tire 10 is itself being formed and cured. The sealant layer may be formed and cured at the same time the vehicle tire is being manufactured to realize production economies, since the subject sealant layer can be cured at the temperatures, about 350° F., employed in curing the other rubber components of the tire. When this is done, it is possible to located the sealant layer in either position as depicted by FIGS. 1 and 2, whereas if the sealant layer is applied after the tire is manufactured, it is only possible to place such a layer inside the air impermeable barrier as illustrated in FIG. 1. Finally, it should be noted if layer 24 is intended to cover the entire inner surface of the tire, the air barrier layer 18 may be eliminated entirely from the vehicle tire construction.

Figure 4:
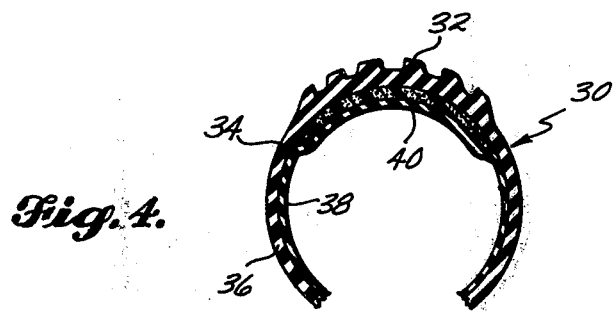
FIG. 4 is a cross-sectional view of a bicycle tire illustrating another embodiment of the invention in which the sealant composition layer is located behind the tread portion of the tire between the innermost surface of the carcass portion of the tire and the tire's inner tube.

Referring now in particular to the bicycle tire sealant embodiment of the present invention and with reference to FIG. 4, a bicycle tire 30 conventionally includes a tread portion 32 and a carcass portion 34 with side walls 36. In bicycle tires, an inner tube 38 is generally disposed within the carcass portion 34, and provides the support and rigid shape for the tire 30 when filled with compressed air. In accordance with the present invention, a sealant layer 40 is disposed on the inner surface of carcass portion 34 behind the tread portion 32 so as to be interposed between the carcass portion 34 and the inner tube 38.

Unlike the vehicle tire sealant layer, the bicycle tire sealant layer 40 is generally not sprayed onto the inner pared to the high loads imposed on a vehicle tire sealant, and the bicycle tire sealant is sandwiched between the tire's carcass portion and the inner tube and thereby trapped on both sides whereas the auto tire sealant is not. However, a bicycle tire sealant must be strong enough to keep from being squeezed out into the rim area by the pressure, probably up to 70 to 80 pounds, within the inner tube. Therefore, the percentage of butyl rubber in the composition may be lower in the bicycle tire sealant than the amount in the vehicle tire sealant. In addition, the amount of thermoplastic elastomeric block copolymer also may be lower and, in fact, may be totally absent from the sealant composition.

The sealant compositions utilized in the following examples were prepared by admixing the ingredients described below in the proportions indicated by Table I. All proportions are given by weight.

TABLE I

| Ingredient | Sealant Compositions (parts by weight) | | | | | | | |
| --- | --- | --- | --- | --- | --- | --- | --- | --- |
| | A | B | C | D | E | F | G | H |
| High Molecular Weight Butyl Rubber[1] | 9.5 | 9.5 | 10.03 | 14.25 | 9.0 | 14.5 | 10.4 | 4.8 |
| Low Molecular Weight Butyl Rubber[2] | 14.5 | 14.5 | 15.04 | 9.5 | 13.0 | 9.5 | 6.9 | 19.2 |
| Tackifier[3] | 61.75 | 61.75 | 65.16 | 62.0 | 63.75 | 61.75 | 60.0 | 61.75 |
| Carbon Black | 9.5[4] | 9.5[4] | 4.76[5] | 9.5[4] | 9.5[4] | 9.5[4] | 17.2[6] | 9.5[4] |
| Block Copolymer[7] | 4.75 | 4.75 | 5.01 | 4.75 | 4.75 | 4.75 | 5.0 | 4.75 |
| Para Quinone Dioxime* | 2.5 | 2.5 | 2.5 | 2.5 | 2.5 | 2.5 | 4.0 | 2.5 |
| Benzoyl Peroxide* | 7.9 | 7.0 | 7.9 | 10.0 | 7.9 | 7.0 | 10.0 | 7.9 |

[1]A copolymer was used consisting of 98.5% isobutylene and 1.5% isoprene by weight having average molecular weight between 10,000 adn 300,000, available from Exxon Oil Company under Trademark "Butyl 365".
[2]A copolymer was used consisting of 96% isobutylene and 4% isoprene by weight having average molecular weight between 10,000 and 30,000, available from Exxon Oil Company under Trademark "Butyl LM-43".
[3]A polymer was used consisting of 98% isobutylene and 2% isoparaffins, having average molecular weight between 500 and 5,000, available from American Oil Company under Trademark, "Idopol H-300".
[4]A furnace black was used having a surface area of 235 square meters/gram, arithmetic mean particle diameter of 17 millimicrons, and a pH of 9.0 available from Cities Service Oil Company under Trademark "Raven-2000".
[5]A furnace black was used having a surface area of 96 square meters/gram, arithmetic mean particle diameter of 29 millimicrons, and a pH of 8.0 available from Cities Service Oil Company under the Trademark "Raven-1000"
[6]A carbon black composition was used consisting by weight of two parts of high abrasion furnace black (HAF), one part semireinforcing furnace black (SRF), and one part medium thermal black (MT).
[7]A block copolymer was used having a configuration A-(B-A)$_{1-5}$ A representing a polystyrene block and B representing a hydrogenated polyisoprene block, the isoprene making up about two thirds of the compound by weight, and the average molecular weight being between 70,000 and 150,000. The compound is available from the Shell Oil Company under Trademark "Kraton G-6500"
*In parts by weight per 100 parts of total butyl rubber.

surface of the tire 30. This is due to the fact that the area for spraying is too small, and tire 30 is not easily rotated, which is normally required for a uniformly thick layer of sealant. In addition, the tire 30, without inner tube 38, lacks a rigid shape to work with inasmuch as the inner tube 38 provides the support for carcass portion 34. Therefore, the sealant 40 is preferably formed into layers, as previously described, and then layed behind tread portion 32 between carcass 34 and inner tube 38 to be held in position by inner tube 38. In addition, a suitable adhesive may be utilized by secure layer 40 against carcass portion 34. The relative amounts of the various bicycle tire sealant constituents may be varied from those of the vehicle tire sealant composition due to different functional requirements of a bicycle tire as compared to a vehicle tire. A bicycle tire is normally subjected only to an operational temperature range of generally 30° to 125° F. Therefore, a bicycle tire sealant does not require high stength at very high temperature as does a vehicle tire sealant. Furthermore, the problem of creep which is present in a vehicle tire sealant is not a factor in a bicycle tire sealant since it is not subjected to very high temperatures, the centrifugal force loads imposed on a bicycle tire sealant are negligible as com-

EXAMPLE I

A vehicle tire sealant was prepared according to the formula of composition "A" above. The butyl rubber and the block copolymer were first refluxed in toluene for 16 hours at about 250° F. After refluxing, the remaining components, except for the benzoyl peroxide, were added to the mixture, along with additional toluene so that the toluene comprised about 50% of the mixture by weight. Just prior to applying the composition to a tire, 7.9 parts by weight of benzoyl peroxide per 100 parts of butyl rubber components were dissolved in 60 parts of toluene and added to the curable rubber composition.

New Uniroyal JR-78-15 steel belted radial tires were utilized for evaluating the subject sealant composition. The tires were first cleaned by mounting them on a rotator and then applying a one half gallon soap solution containing 50 milliliters of Amway SA-8 soap powder. A steel rotary brush on a flexible cable then was used to scrub the tires with the soap solution when the tires were rotating. Each tire was then thoroughly rinsed out with tap water and dried at ambient (70° F)

temperature prior to coating its inside surface with the sealant composition.

To apply the above composition "A" to the tire, the tire was first preheated to about 125° F for approximately one half hour. The tire was then removed from the oven and a quantity of the subject sealant composition, prepared as described above, was provided, including the benzoyl peroxide activator. The sealant composition, dispersed in toluene, was then sprayed onto the inner surface of the cleaned and preheated tire employing commercial air paint spray equipment. A pressure feed was employed and the sealant was sprayed using 50 psig compressed air. The tire was rotated as the sealant was sprayed onto the internal surface and directed to the region behind the tread as shown in FIG. 1. Approximately 290 grams, on a solvent free basis, of the composition "A" were applied. Some of the toluene evaporated during the spraying and the applied composition gelled in the tire in about five minutes. The tire was then left at ambient temperature for approximately one half hour to evaporate any excess toluene solvent and to cure the sealant composition layer.

The cycle of heating, spraying and setting was repeated two more times in identical fashion, except that after the third spraying, the tire was set aside and allowed to remain at ambient temperature for approximately 30 days in order to age and reach its final cure properties. The resultant coating had approximately 870 grams of the solid composition and was approximately 0.100 inches thick. The amount of the layer applied to a tire may, however, be larger or smaller than the above 870 grams depending on the size of the tire and desired sealing performance.

In order to test the sealant composition's ability to seal a puncture wound in the tire, a tire was mounted on a wheel and inflated with air to about 28 psig. The wheel and tire were then mounted on an axle and rotated at approximately 5 miles per hour against a free rotating wheel during the puncturing test. Pressure was applied on the axle against the free rotating wheel to obtain a load approximately 900–1000 pounds. The tire was then punctured with two spikes of 0.265 inches thick in diameter, with one spike puncturing the center rib of the tread and the other spike puncturing the outside rib of the tread. These dynamic tests were performed at ambient temperature (about 70° F). After puncturing, the tire was run fifteen minutes with the nails in place after which the nails were removed. The pressure within the tire was then monitored every hour for approximately eight hours or until the pressure had dropped to 15 psig if there was in fact a leak. Also, after removal of the nails each puncture was squirted with a commercial soapy leak detector called "Snoop" to visually observe if any leakage took place. It should also be noted that static puncturing tests were performed on the tire at temperatures of −20° F and 270° F., and the nails utilized in these static tests were 0.375 inches thick in diameter. In each test instance, the tire containing the composition "A" of the present invention sealed each puncture without any significant leakage of air.

Another test was performed to determine the stability of the composition "A" and whether it would flow within the tire during high speed and high temperature conditions. The tire containing the subject sealant composition was run on a smooth test wheel, 67.23 inches in diameter. (85mph on the test wheel was equivalent to at least 100 mph under highway conditions, and the curved surface of the wheel caused more flexing of the tire than a flat surface.) When the tire containing the composition "A" was run on the wheel for 3 hours at 90mph and at 264° F, it was determined after cutting into the tire that only a minor flow of the sealant had occurred, and the sealant was therefore quite stable.

EXAMPLE II

Tire sealant compositions according to the formula of compositions "B" and "C" above were prepared and applied to new tires in the same manner as described in Example I above. The type of tire used was also the same. Puncture sealing tests using 0.265 inch nails were then run in the same manner as in Example I. The results were the tires having the "B" or "C" compositions were sealed without any significant leakage of air.

EXAMPLE III

Tire sealant compounds according to the formula of compositions "E" and "F" above were prepared and applied to tires as in Example I. The tires used were the same as in Example I. Stability tests were then performed in the manner of Example I. The tires having composition "F" were run for two hours at 80mph and 224° F., 2 hours at 90mph and 246° F., and 2 hours at 95mph and 292° F. Only a minor flow of sealant was observed. The tire having composition "F" was run for 3 hours at 90mph and 262° F, resulting in only a minute amount of sealant flow.

EXAMPLE IV

A tire sealant compound according to the formula of composition "G" was prepared and applied to a tire as in Example I, except that only 200 grams of the compound, on a solvent free basis, were applied at each spraying, and the tire was alowed to set overnight rather than for thirty days after the final sealant application. The tire was then mounted on a wheel and inflated with air to 30 psig. The wheel was rotated and the tire was punctured with 0.20 and 0.25 inch diameter spikes at temperatures of −20° F, ambient, and 270° F. and the spike was removed. After puncturing at each temperature, each puncture was squirted with "Snoop" to observe if any leakage took place. The tire sealed itself without any significant leakage of air.

EXAMPLE V

A tire sealant compound according to the formula of composition "D" was prepared and applied to a tire as in Example IV, except that after the third 200 gram sealant application the tire was set aside for an hour at ambient temperature and then cured for 16 hours at 125° F. The puncture tests described in Example IV were then performed. In each instance, the sealant healed the puncture without significant loss of air.

EXAMPLE VI

A number of tackifiers other than "Indopol H-300" were investigated during the search for the optimum sealant composition. "Indopol" polybutylenes are available in a number of molecular weight ranges, including a low molecular weight variety, "Indopol H-50", and a high molecular weight variety "Indopol H-1900". All of these were found to have utility for environmental conditions that did not subject the sealant composition to high temperature.

Terpene polymer resins such as "Piccolyte S-10", a resin of B-pinene avialable from Hercules Incorporated were found quite satisfactory, having good high temperature cohesion and stability.

Low molecular weight styrene polymer resins such as "Piccolastic E-50", a polymer of A-methylstyrene available from Hercules Incorporated, were found quite satisfactory in combination with other tackifiers up to about 50 wt.% of the tackifier constituent.

In general, it was found that suitable high temperature tackifiers were those with softening points of not greater than 50° C.

EXAMPLE VII

A sealant composition according to the formula of combination "H" was prepared in the same manner as described in Example I above. The sealant was applied to a flat surface and allowed to cure. Tensile tests were performed on specimens of the composition from which it was determined that the modulus of elasticity was substantially constant and that the composition was exceedingly soft. To perform as a tire sealant, the butyl rubber content, of a 20/80 ratio, should be in the range of 30–40% by weight with a concommitant decrease in the weight % of the tackifier, all other constituents of composition "H" remaining the same.

EXAMPLE VIII

A sealant composition according to the formula of composition "B" was prepared in the same manner as in Example I. Instead of being sprayed, however, the composition was poured onto a flat surface and a draw down bar was drawn over the surface to produce a flat sealant layer. After curing, the sealant was cut into strips which were applied to bicycle tires as depicted in FIG. 4. The tires were standard medium weight bicycle tires, and were inflated to 45 psig. Nails having 0.115 inch diameters were inserted into the tires and then removed. No significant loss of air was detected.

With the exception of sealant composition "H", the sealant compositions used in the foregoing examples were found to have moduli of elasticity in the range of 5 to 9 lbs/in.$^2$. Above 9 lbs/in.$^2$, the sealant would be too stiff to self heal after a puncturing object was removed. Below 5 lbs/in.$^2$, the sealant would creep at combinations of centrifugal force and temperature to be expected in a vehicle tire. The preferred range of most effective tire sealants is between 6 and 8 lbs/in.$^2$. By increasing the weight % of butyl rubber in composition "H", as described in Example VII, the composition "H" modulus of elasticity, still remaining substantially constant, would be brought within the preferred range. For other applications, the degree of butyl rubber cross-linking may be varied to produce higher or lower modulii of elasticity as required by the particular environment.

As can be seen from the above, the present sealant composition not only elinimates the problems of high speed and high temperature sealant flow as well as sufficient tensile strength, but the subject invention, due to its unique and novel ratio of high to low molecular weight curable butyl rubbers, results in considerably improved puncture sealing capabilities, especially when the puncturing object remains in the tire. In addition, the sealant composition of the instant invention may also be utilized for numerous other purposes including uses as a tire patch, an auto sealant, a roofing sealant, a caulking compound, a general household sealant and others.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

What is claimed is:

1. A sealant composition comprising a reinforced partially cross-linked matrix comprising a high average molecular weight butyl rubber having a molecular weight in the range of approximately 100,000 to 400,000 and a low average molecular weight butyl rubber having a molecular weight in the range of approximately 10,000 to 40,000, in a ratio of high to low molecular weight butyl rubber of between about 35/65 and 45/55, in admixture with a tackifier present in an amount between about 55 and 70 weight % of the composition.

2. The sealant composition of claim 1, wherein the high molecular weight butyl rubber and the low molecular weight butyl rubber are comprised of a major proportion of isobutylene.

3. The sealant composition of claim 1, wherein the high molecular weight butyl rubber and the low molecular weight butyl rubber consist of between about 96% to 99% by weight isobutylene and between about 4% to 1% by weight isoprene.

4. The sealant composition of claim 1, including a partially hydrogenated block copolymer in admixture with the matrix, said block copolymer having the general configuration A—(B—A)$_{1-5}$ wherein each A is a monovinyl arene polymer block and each B is a substantially fully hydrogenated conjugated diene polymer block.

5. The sealant composition of claim 4, wherein the partially hydrogenated block copolymer is present in an amount up to about 10% of the total composition by weight.

6. The sealant composition of claim 1, wherein the tackifier is selected from the group consisting of synthetic polyterpenes, thermoplastic olefins, pentaerythritol esters of hydrogenated rosins, thermoplastic hydrocarbons, triethylene glycol esters of hydrogenated rosins, vinyl toluene copolymers, alkyl aromatics, coumarone-indenes and methyl esters of hydrogenated rosins.

7. The sealant composition of claim 1, wherein the tackifier is selected from the group consisting of polymers of butylene, terpene polymer resins and low molecular weight styrene polymer resins.

* * * * *